(12) United States Patent  
Kumasaka et al.

(10) Patent No.: US 8,368,838 B2  
(45) Date of Patent: Feb. 5, 2013

(54) PLANAR LIGHT-EMITTING DEVICE AND LIQUID CRYSTAL DISPLAY APPARATUS

(75) Inventors: Taku Kumasaka, Tsuru (JP); Daisaku Okuwaki, Fujiyoshida (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 748 days.

(21) Appl. No.: 12/499,387

(22) Filed: Jul. 8, 2009

(65) Prior Publication Data

US 2010/0007819 A1    Jan. 14, 2010

(30) Foreign Application Priority Data

Jul. 9, 2008   (JP) .................................. 2008-178918

(51) Int. Cl.  
*G02F 1/1335* (2006.01)

(52) U.S. Cl. ............ 349/61; 349/65; 362/616; 362/612; 362/97.2

(58) Field of Classification Search .................... 349/65, 349/64, 61; 362/97.2, 97.1, 611, 612, 613, 362/621, 615–617; 315/294  
See application file for complete search history.

(56) References Cited

U.S. PATENT DOCUMENTS

| | | | |
|---|---|---|---|
| 6,746,129 B2 * | 6/2004 | Ohkawa ........................ 362/625 |
| 7,165,856 B2 * | 1/2007 | Tseng et al. .................... 362/26 |
| 7,658,530 B2 * | 2/2010 | Liu ................................. 362/606 |
| 2007/0247871 A1 | 10/2007 | Yoo |
| 2011/0187636 A1 | 8/2011 | Suzuki |

FOREIGN PATENT DOCUMENTS

| | | |
|---|---|---|
| JP | 2007-293339 | 11/2007 |
| JP | 2008-90076 | 4/2008 |
| WO | 2009/157351 | 12/2009 |

OTHER PUBLICATIONS

Japanese Office Action (and English translation thereof) dated Oct. 15, 2012 in Japanese Application 2008-178918.

* cited by examiner

*Primary Examiner* — Thoi Duong  
(74) *Attorney, Agent, or Firm* — Wenderoth, Lind & Ponack, L.L.P.

(57) ABSTRACT

A planar light-emitting device enabling more precise local dimming has a plurality of light-emitting units each including a lightguide plate and a plurality of light sources disposed successively in the lateral width direction of the light-entrance surface and adjacently facing a light-entrance surface of the lightguide plate to emit light into the lightguide plate through the light-entrance surface. The light sources are divided into a plurality of groups successively arranged in the width direction, each group including at least one light source. The lightguide plates of the light-emitting units are mutually adjacently disposed with their light-exiting surfaces being flush with each other. The planar light-emitting device has a light source output control unit that controls the outputs of the light sources for each group.

20 Claims, 5 Drawing Sheets

PLANAR LIGHT-EMITTING DEVICE AND LIQUID CRYSTAL DISPLAY APPARATUS

This application claims priority under 35 U.S.C. §119 to Japanese Patent application No. JP2008-178918 filed on Jul. 9, 2008, the entire contents of which are hereby incorporated by reference.

TECHNICAL FIELD

The present invention relates to a planar light-emitting device that illuminates a liquid crystal display panel or the like. The present invention also relates to a liquid crystal display apparatus having the planar light-emitting device.

BACKGROUND ART

Liquid crystal display apparatuses for image display are widely used as large-sized displays of flat-screen televisions and monitors, etc. The liquid crystal display apparatuses employ a backlight unit that applies light to a liquid crystal display panel from the rear or lower side to enhance the luminance of the display screen.

The backlight unit has a lightguide plate and a light-emitting diode (LED) or other light source disposed to face a part of the peripheral side surface of the lightguide plate. The lightguide plate guides light from the light source through it and emits the guided light toward the liquid crystal display panel from the whole of a light-exiting surface of the lightguide plate that faces the display panel.

Recently, as liquid crystal television systems increase in size, there has been an increased demand for further reduction in weight and thickness of lightguide plates used in them. In this regard, as the thickness of a lightguide plate is reduced, it becomes more likely that color irregularity and luminance unevenness will occur on the light-exiting surface of the lightguide plate. If injection molding is employed as a method of producing a large-sized lightguide plate, it is difficult to fill the resin material throughout the molding tool for the large lightguide plate. It is necessary in order to solve this problem to increase the injection pressure, which, however, will cause an increase in the cost of equipment.

Under these circumstances, there has been proposed a backlight unit comprising a plurality of light-emitting units having respective lightguide plates arranged lengthwise and widthwise and a plurality of LEDs provided for each lightguide plate to emit light into it (see Japanese Patent Application Publication No. 2007-293339). In this backlight unit, the LEDs are driven for each light-emitting unit to perform local dimming. More specifically, the outputs of the light-emitting units constituting the backlight unit are controlled for each light-emitting unit on the basis of image data input to the liquid crystal display panel to control the output (brightness) for each light-emitting unit, thus reducing the power consumption and improving the contrast of the liquid crystal display screen and the moving picture performance, for example.

There has also been proposed a liquid crystal display apparatus having a liquid crystal display panel that displays an image signal input to it and a backlight unit having a plurality of light-emitting units comprising RGB light-emitting diodes, which are arranged lengthwise and widthwise. The image signal is divided into blocks corresponding to the size of each light-emitting unit. The luminance and image data of each block are analyzed, and the luminance of each light-emitting unit is set based on the result of the analysis (see Japanese Patent Application Publication No. 2008-90076).

That is, this liquid crystal display apparatus also controls the luminance for each light-emitting unit to perform local dimming for improving the image quality (contrast and color reproduction range) and reducing the power consumption in the same way as the liquid crystal display apparatus disclosed in the above-described Japanese Patent Application Publication No. 2007-293339 and so forth.

The above-described conventional techniques, however, still have the following problems to be solved.

With the conventional techniques, the luminance is controlled for each light-emitting unit; therefore, it is difficult to perform control for a screen area smaller than the light-emitting unit and hence difficult to effect more precise local dimming. In addition, it is likely that there will be a large difference in luminance at the boundary between the light-emitting units.

SUMMARY OF THE INVENTION

The present invention has been made in view of the above-described problems with the conventional techniques. Accordingly, an object of the present invention is to provide a planar light-emitting device enabling more precise local dimming to allow a further reduction of the power consumption and capable of reducing the luminance difference at the boundary between the lightguide plates of mutually adjacent light-emitting units. Another object of the present invention is to provide a liquid crystal display apparatus using the planar light-emitting device of the present invention.

The present invention provides a planar light-emitting device including a plurality of adjacently disposed light-emitting units. Each light-emitting unit has a plurality of light sources and a lightguide plate having an upper surface as a light-exiting surface, a lower surface opposite to the upper surface, and a peripheral side surface extending between the respective peripheral edges of the upper and lower surfaces. The peripheral side surface of the lightguide plate has a front-side surface as a light-entrance surface, a rear-side surface opposite to the front-side surface, and right and left side surfaces extending between the respective ends of the front- and rear-side surfaces. The light sources are disposed successively in the width direction of the light-entrance surface to face the light-entrance surface of the lightguide plate. The light sources are divided into a plurality of light source groups successively arranged in the width direction of the light-entrance surface of the lightguide plate. Each light source group includes at least one light source. The lightguide plates of the light-emitting units are mutually adjacently disposed with their light-exiting surfaces being flush with each other to form an integrated light-exiting surface. The planar light-emitting device further includes a light source output control unit that controls the outputs of the light sources of each light-emitting unit for each light source group.

In this planar light-emitting device, a plurality of light sources arranged successively in the width direction of the light-entrance surface of the lightguide plate in each light-emitting unit are divided into a plurality of groups, and the outputs of the light sources are controlled for each group. That is, the light source groups are arranged to emit light from respective light-exiting areas of the light-exiting surface of the lightguide plate that are located at respective positions corresponding to the travel directions of light emitted from the light source groups. Therefore, the outputs of light (including the quantity and color of light) emitted from the light-exiting areas of the light-exiting surface of the lightguide plate can be controlled for each light-exiting area. Accordingly, as compared to the above-described conventional system that controls the outputs of the light sources for each light-emitting unit, more precise local dimming can be performed by the output control for each group of light sources of each light-emitting unit. In addition, it becomes possible to further reduce the power consumption.

Specifically, the light source output control unit may change the outputs of the light sources successively stepwise for each of the light source groups arranged in the width direction of the light-entrance surface of each lightguide plate. With this planar light-emitting device, the difference in luminance between the lightguide plates of mutually adjacent light-emitting units can be reduced, for example.

The light source output control unit may control the outputs of the light source groups as follows: The difference in luminance between the mutually adjacent endmost light source groups of a pair of light-emitting units that are adjacent to each other and aligned along the width direction of the light-entrance surface of the lightguide plate may be set smaller than or equal to the difference in luminance between the other mutually adjacent light source groups of the pair of mutually adjacent light-emitting units. The luminances of the mutually adjacent endmost light source groups of the pair of mutually adjacent light-emitting units may be set higher than the luminances of the other mutually adjacent light source groups of the pair of mutually adjacent light-emitting units.

The light-exiting surface of the lightguide plate has light-exiting areas located at respective positions corresponding to the travel directions of light emitted from the light source groups. The lightguide plates adjacent to each other and aligned in the width direction of their light-entrance surfaces are disposed with their front-side surfaces as light-entrance surfaces being aligned flush with each other. The light source output control unit controls the light sources for each of the adjacent light source groups. Therefore, the luminances of the respective mutually adjacent endmost light-exiting areas of the lightguide plates of a pair of mutually adjacent light-emitting units can be set equal to each other. Alternatively, the difference between the luminances of the endmost light-exiting areas can be set smaller than the difference in luminance between the light-exiting areas that are adjacent to each other in each of the adjacent lightguide plates. That is, this planar light-emitting device can eliminate or reduce the difference in luminance between the light-exiting surfaces of the lightguide plates that are adjacent to each other in the width direction, i.e. the lateral direction, of the light-entrance surface.

The lightguide plate may be of rectangular shape having a pair of mutually opposing long sides and a pair of mutually opposing short sides in planar view. The above-described front-side surface may be a surface along one long or short side of the rectangular shape.

As one embodiment of the present invention, the planar light-emitting device is arranged as follows. In at least one light-emitting unit, the front-side surface of the peripheral side surface of the lightguide plate is defined as a first light-entrance surface. The light sources disposed successively in the width direction of the first light-entrance surface are defined as first light sources. The light source output control unit that controls the outputs of the first light sources for each light source group is defined as a first light source output control unit. Either of the right and left sides surfaces of the lightguide plate is defined as a second light-entrance surface. The planar light-emitting device further has a plurality of light sources as second light sources successively disposed to face the second light-entrance surface in the width direction of it. The second light sources are divided into a plurality of second light source groups successively arranged in the width direction of the second light-entrance surface. Each second light source group includes at least one second light source, and outputs of the second light sources of each of the light-emitting units for each of the light source groups may also be controlled.

That is, in the above-described planar light-emitting device, at least one light-emitting unit has not only a plurality of light sources disposed in the lateral direction, i.e. the width direction of the first light-entrance surface but also a plurality of light sources as second light sources disposed in the longitudinal direction, i.e. the width direction of a second light-entrance surface defined by either of the right and left side surfaces of the lightguide plate. The second light sources are divided into a plurality of groups, and the outputs of the second light sources are controlled for each group. Accordingly, more precise local dimming can be enabled by controlling the outputs of the second light sources for each group in combination with the output control of the first light sources for each group.

In addition, the present invention provides a liquid crystal display apparatus including a liquid crystal display panel and the above-described planar light-emitting device, which is disposed underneath the liquid crystal display panel. In the liquid crystal display apparatus, the light source output control unit controls the outputs of the light sources in accordance with image data on images to be displayed on the display areas of the liquid crystal display panel located directly above the respective light-exiting surfaces of the light-emitting units of the planar light-emitting device.

This liquid crystal display apparatus enables more precise local dimming and can perform liquid crystal display at a further reduced power consumption.

Embodiments of the planar light-emitting device and liquid crystal display apparatus using the planer light-emitting device according to the present invention will be explained below with reference to the accompanying drawings. It should be noted that, in the figures used in the following explanation, the scale is properly changed to show each member in a recognizable size.

DETAILED DESCRIPTION OF THE INVENTION

Figure 4:
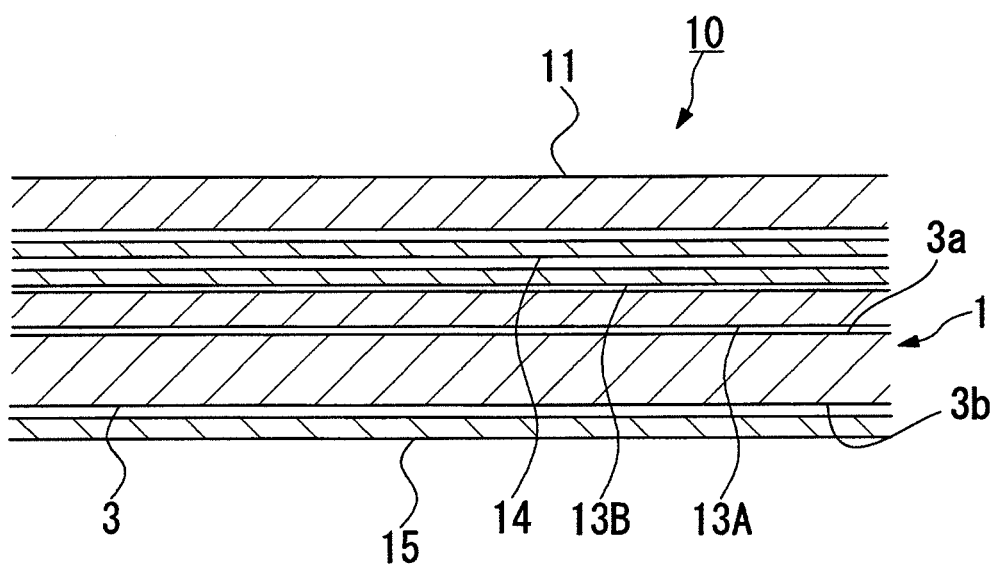
FIG. 4 is a fragmentary enlarged sectional view showing a main part of the liquid crystal display apparatus having the planar light-emitting device according to one embodiment of the present invention, with a bezel and a rigid board removed.
Figure 5:
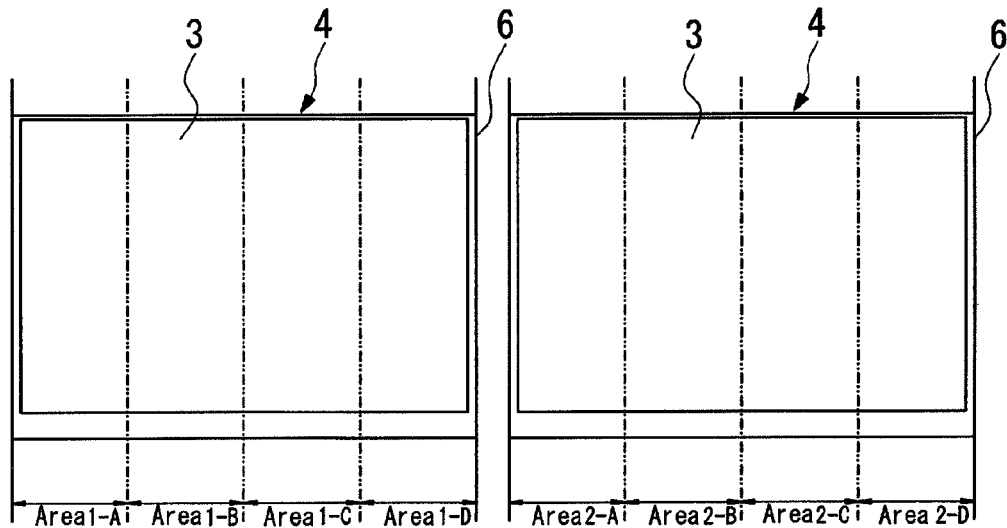
FIG. 5 is a plan view of two mutually adjacent light-emitting units constituting the planar light-emitting device according to one embodiment of the present invention, showing the positional relationship between the light-exiting areas of the light-exiting surfaces of the two light-emitting units.

A planar light-emitting device 1 according to a first embodiment of the present invention is usable as a backlight unit of a liquid crystal display apparatus 10 having a layered structure as shown in FIG. 4. The liquid crystal display apparatus 10 has a diffusing plate 13A that diffuses light from the planar light-emitting device 1 to make the light intensity uniform, a diffusing sheet 13B disposed over the diffusing plate 13A, a prism sheet 14 disposed over the diffusing sheet 13B to direct light from the diffusing sheet 13B upward toward a liquid crystal display panel 11 as illuminating light, and a reflecting sheet 15 disposed underneath lightguide plates 3.

Figure 1:
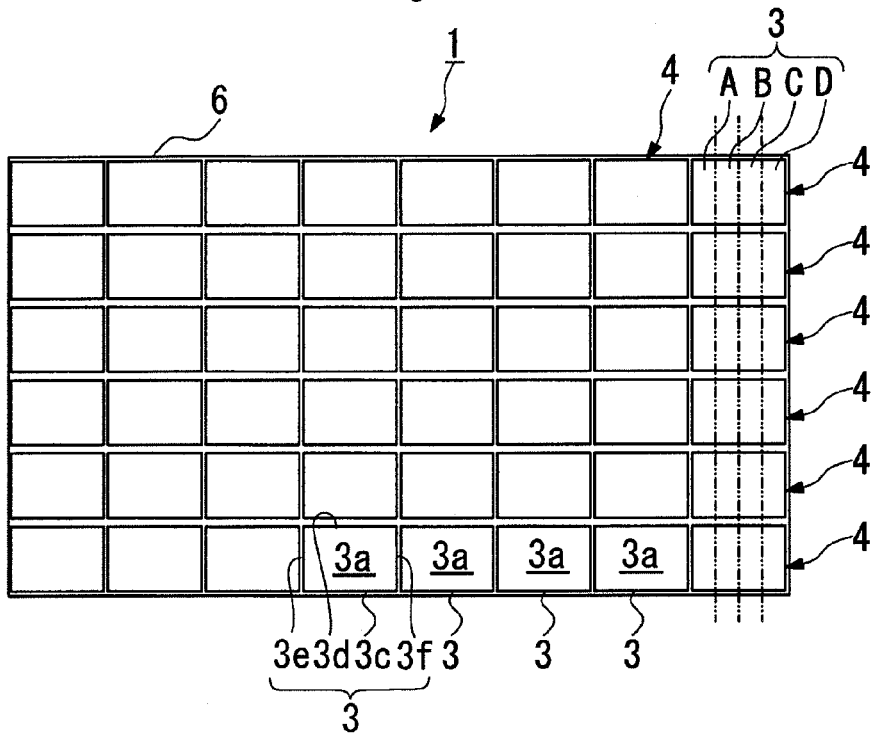
FIG. 1 is a plan view of a planar light-emitting device according to a first embodiment of the present invention.
Figure 2:
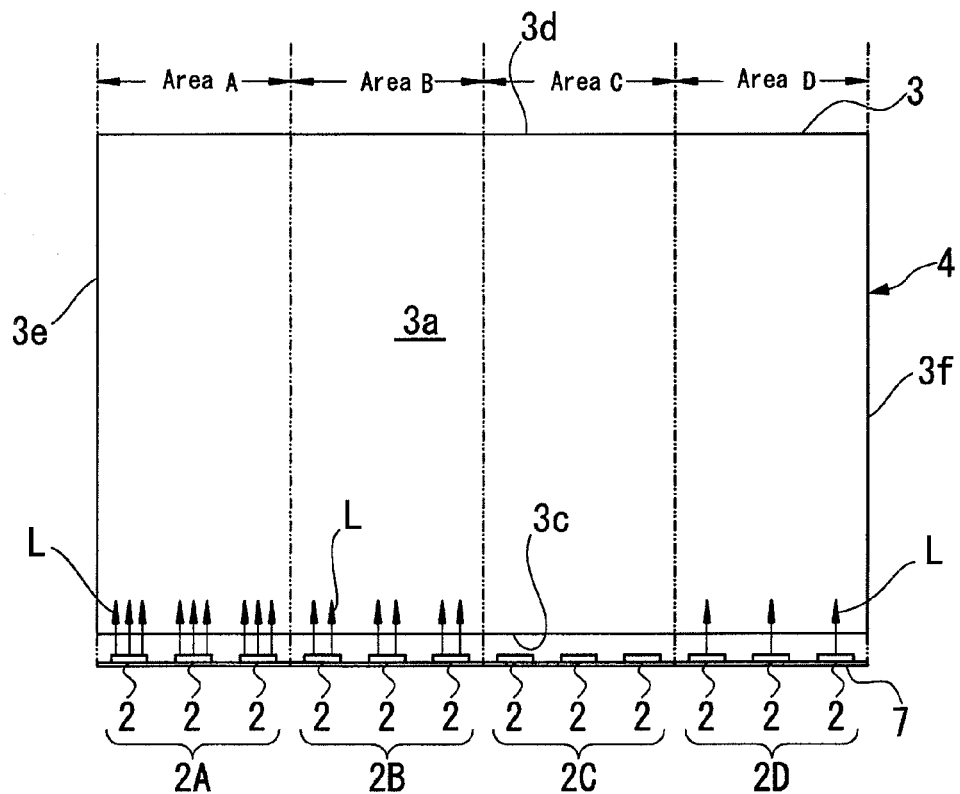
FIG. 2 is a plan view of one light-emitting unit constituting the planar light-emitting device in FIG. 1, showing the relationship between light sources divided into groups, light emitted from the light sources of each group into the lightguide plate and light-exiting areas corresponding to the travel directions of the light traveling through the lightguide plate.

As shown in FIG. 1, the planar light-emitting device 1 has 48 light-emitting units 4 arranged in a matrix of 8 vertical rows and 6 horizontal rows. Each light-emitting unit 4 has a rectangular lightguide plate 3 having a pair of mutually opposing long sides and a pair of mutually opposing short sides, and a plurality of LED light sources (light sources) 2 aligned successively along the width direction of the light-entrance surface of the lightguide plate 3, the light-entrance surface being one side surface, or at long side, of the lightguide plate 3, as shown in FIG. 2. The light-exiting surfaces 3a of the lightguide plates 3 of the light-emitting units 4 are arranged flush with each other to form an integrated light-exiting surface of the planar light-emitting device 1.

Specifically, the lightguide plate 3 has an upper surface 3a as a light-exiting surface, a lower surface 3b opposite to the upper surface 3a (see FIG. 4), and a peripheral side surface extending between the respective peripheral edges of the upper and lower surfaces 3a and 3b. The peripheral side surface has a front-side surface 3c as a light-entrance surface, a rear-side surface 3d opposite to the front-side surface 3c, and left and right side surfaces 3e and 3f extending between the respective ends of the front- and rear-side surfaces 3c and 3d.

The plurality of LED light sources 2 are, as shown in FIG. 2, disposed to face the light-entrance surface 3c successively in the width direction of the light-entrance surface 3c to emit light L into the lightguide plate 3 through the light-entrance surface 3c. The light sources 2 are divided into a plurality of groups 2A, 2B, 2C and 2D successively arranged in the width direction of the light-entrance surface 3c. Each light source group includes at least one light source (three light sources in this embodiment). The light source groups 2A, 2B, 2C and 2D each direct light toward the rear-side surface 3d opposite to the light-entrance surface 3c. In this regard, the light source groups 2A, 2B, 2C and 2D are arranged to emit light that is directed upward toward the liquid crystal display panel 11 from respective light-exiting areas A, B, C and D of the lightguide plate 3 located at respective positions corresponding to the travel directions of light traveling through the lightguide plate 3 from the light sources 2 of the groups 2A, 2B, 2C and 2D toward the rear-side surface 3d.

Figure 3:
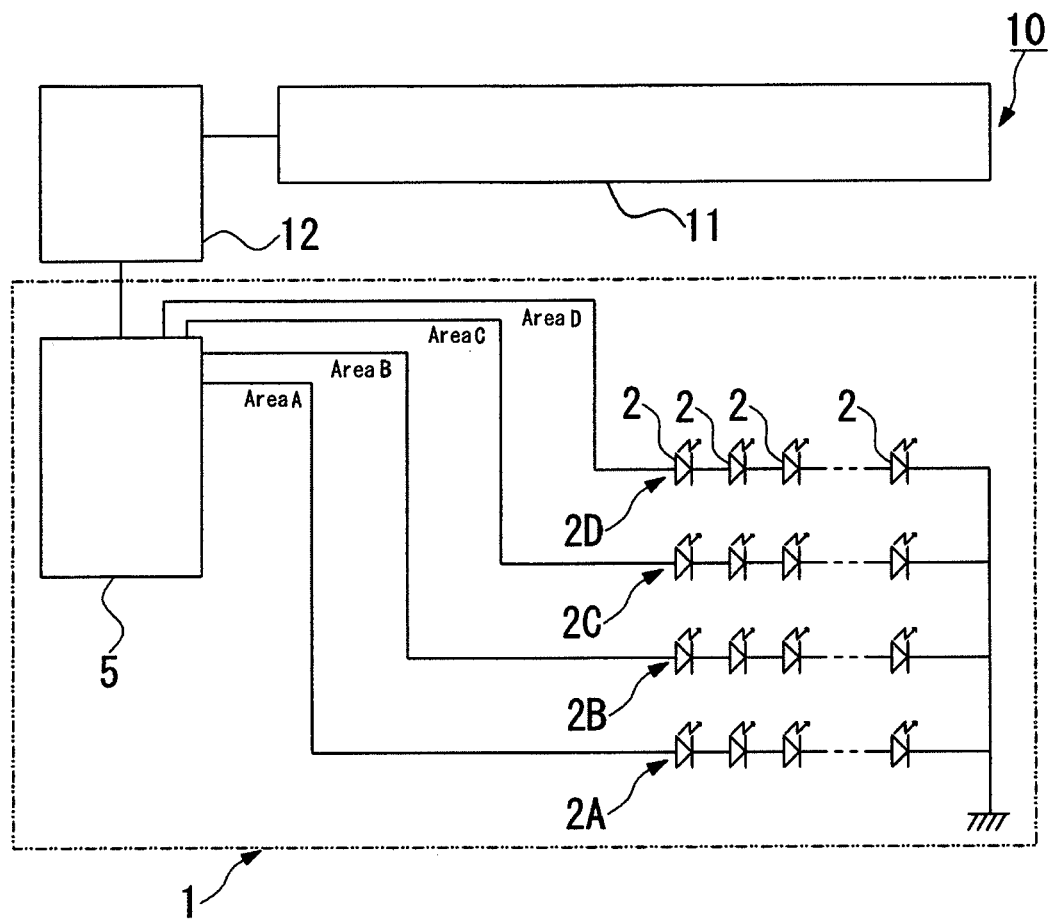
FIG. 3 is a diagram schematically showing a liquid crystal display panel of a liquid crystal display apparatus using the planar light-emitting device in FIG. 1 and a control circuit that controls the output of the planar light-emitting device.

FIG. 3 shows a control circuit having a liquid crystal driving circuit 12 that controls the drive of the liquid crystal display panel 11 of the liquid crystal display apparatus 10 and a light source output control unit 5 that controls the outputs of the light sources 2 of each light-emitting unit 4 for each of the groups 2A to 2D on the basis of signals from the liquid crystal driving circuit 12.

The liquid crystal driving circuit 12 outputs data on an image to be displayed to the liquid crystal display panel 11 to display the image on it. The liquid crystal driving circuit 12 also outputs, to the light source output control unit 5, information concerning image data on the liquid crystal display panel 11 corresponding to the light-exiting areas A, B, C and D of the lightguide plate 3.

The light source output control unit 5 controls the luminance or emission color at the light-exiting areas A to D according to the information concerning image data sent from the liquid crystal driving circuit 12, i.e. information concerning the luminance and contrast of images to be displayed on the display areas of the liquid crystal display panel 11 located directly above the light-exiting areas A to D of the lightguide plate 3.

For example, the light emission quantity of the light sources is increased for a light-exiting area of the lightguide plate 3 corresponding to a display area of the liquid crystal display panel 11 where a bright image is to be displayed. Conversely, the light emission quantity of the light sources is reduced for a light-exiting area of the lightguide plate 3 corresponding to a dark display area where a dark image is to be displayed. By so doing, the contrast of the overall image displayed on the liquid crystal display panel 11 can be increased.

The whole display screen of the liquid crystal display panel 11 may be divided into a plurality of screens to display different images or pictures simultaneously. In such a case, it is also possible to perform output control for the light-exiting areas of the lightguide plates corresponding to the divided screens.

As stated above, the light source output control unit 5 performs output control to control the luminance or emission color of the light source groups for each of the corresponding light-exiting areas A to D of the lightguide plates 3, thus enabling local dimming of the liquid crystal display panel 11.

Next, local dimming of the liquid crystal display apparatus using the planar light-emitting device according to this embodiment will be explained with reference to FIGS. 5 to 8.

Figure 6:
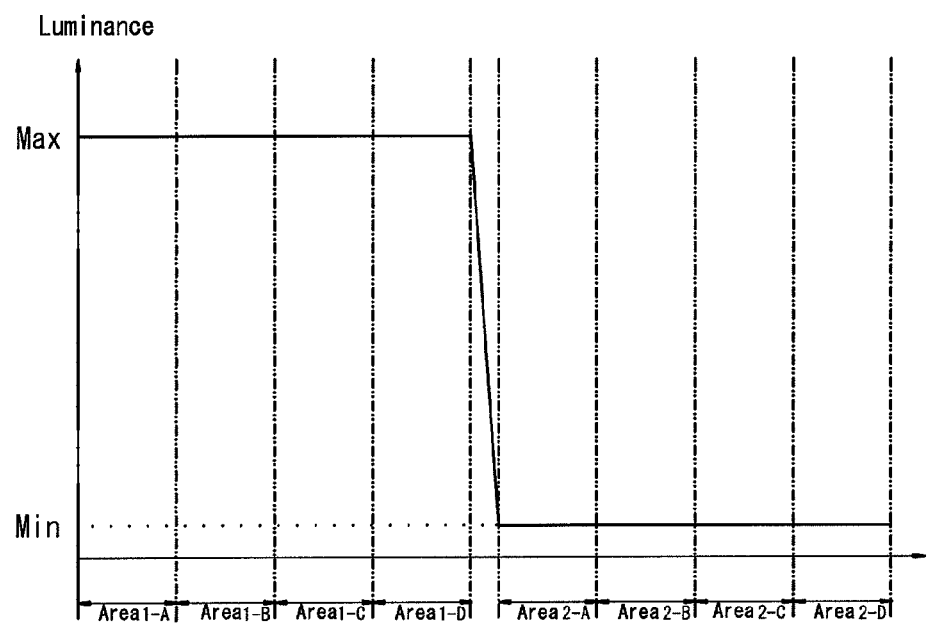
FIG. 6 is a graph showing the luminance distribution over the light-exiting surfaces of two conventional mutually adjacent light-emitting units arranged in correspondence to those shown in FIG. 5.

In a typical conventional system, the light quantity of the LED light sources 2 is controlled for each of the lightguide plates 3 of the light-emitting units 4 to set the luminance of the lightguide plate 3 concerned. Therefore, as shown in FIG. 6, the luminance distribution may greatly change in two steps between two mutually adjacent lightguide plates 3, thus producing a large difference in luminance at the boundary between the lightguide plates 3. In other words, the luminance may sharply change at the joint between adjacent lightguide plates 3 when local dimming is performed according to image data on an image to be displayed on the liquid crystal display panel 11.

Figure 7:
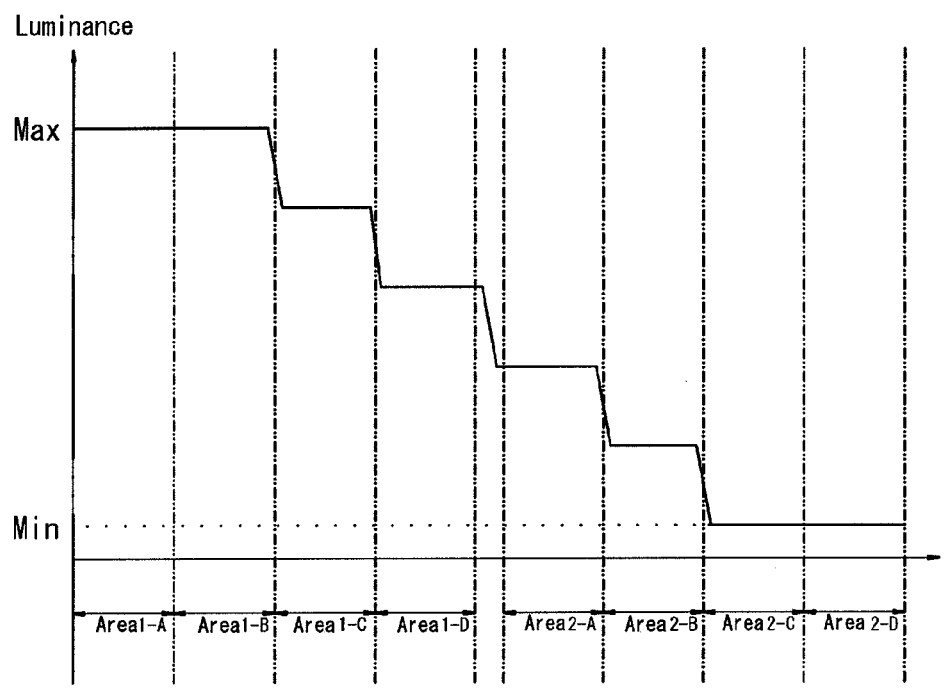
FIG. 7 is a graph showing an example of the luminance distribution over the light-exiting surfaces of the light-emitting units of the planar light-emitting device according to one embodiment of the present invention shown in FIG. 5.

In contrast, in this embodiment, the light source output control unit 5 controls the light quantity for each of the groups 2A to 2D of the light sources 2 corresponding to the light-exiting areas A to D of each lightguide plate 3. Therefore, as shown in FIG. 7, the luminance distribution changes gradually in six steps at the six light-exiting areas 1-A, 1-B, 1-C, 1-D, 2-A, 2-B, 2-C and 2-D of the left and right lightguide plates 3. Consequently, the difference in luminance between the light-exiting areas 1-D and 2-A at the boundary between the adjacent lightguide plates 3 can be made substantially the same as the luminance difference between the adjacent light-exiting areas of each lightguide plate 3. To achieve this in actual practice, the luminance difference between the groups of the light sources 2 corresponding to the light-exiting areas 1-A, 1-B, 1-C, 1-D, 2-A, 2-B, 2-C and 2-D is made substantially the same.

Figure 8:
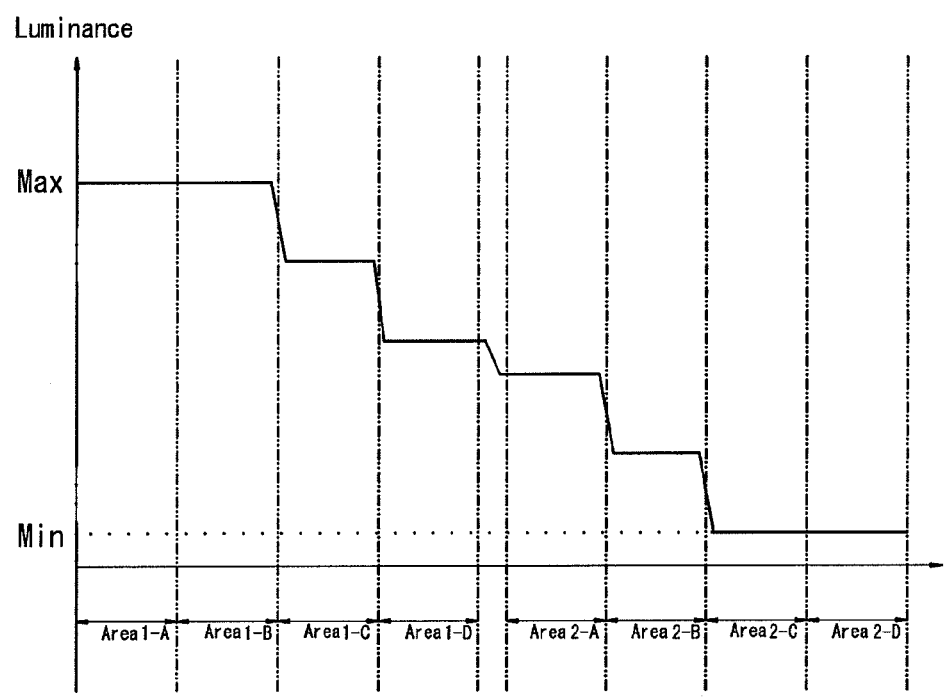
FIG. 8 is a graph showing another example of the luminance distribution over the light-exiting surfaces of the light-emitting units of the planar light-emitting device according to the present invention shown in FIG. 5.

The joint between mutually adjacent lightguide plates 3 can be made inconspicuous by setting, as shown in FIG. 8, the luminance difference between the mutually adjacent light-exiting areas 1-D and 2-A of the adjacent lightguide plates 3 smaller than the luminance difference between the adjacent light-exiting areas in the light-exiting surface 3a of one lightguide plate 3 by the control made by the light source output control unit 5 for each light source group. It is also possible to eliminate the luminance difference between the mutually adjacent light-exiting areas 1-D and 2-A of the adjacent lightguide plates 3. In actual practice, the luminance difference between the mutually adjacent light-exiting areas 1-D and 2-A is eliminated by eliminating the luminance difference between the light source groups corresponding to the light-exiting areas 1-D and 2-A.

Thus, the planar light-emitting device 1 of this embodiment can control the luminance or emission color for each of the light-exiting areas A to D of each lightguide plate 3, but not for each of the lightguide plates 3 of the light-emitting units 4. Accordingly, it becomes possible to perform more precise local dimming and to reduce the power consumption.

Therefore, the liquid crystal display apparatus 10 employing the planar light-emitting device 1 as a backlight unit enables more precise local dimming corresponding to each display area of the liquid crystal display panel 11 so that the liquid crystal display of images and video pictures becomes more satisfactory and easier to see with a reduced power consumption.

The details of this embodiment will be described below.

For the illustrated planar light-emitting device 1, the shape and the number of lightguide plates 3 to be installed are determined to realize an aspect ratio of 16:9, which is the mainstream aspect ratio for large-sized backlight units. The lightguide plates 3 are formed of a transparent polycarbonate or acrylic resin, for example. The lightguide plates 3 are secured to a bezel (not shown), for example, and in this state, installed on a rigid board 6. The LED light sources 2 of each lightguide plate 3 are connected to a flexible printed circuit board 7 secured to the bezel.

Each lightguide plate 3 has a plurality of light-entrance prisms (not shown) of V-shaped sectional configuration, for example, formed on each of regions of the front-side surface 3c as a light-entrance surface that face the LED light sources 2, respectively. The light-exiting surface is provided with a white dot pattern (not shown), for example. It should be noted that the upper surface of the lightguide plate 3, which serves as a light-exiting surface, or the lower surface of the lightguide plate 3 opposite to the light-exiting surface may be provided with prism- or lenticular lens-shaped microscopic optical configurations, for example. If the light exiting surface is provided with prisms extending in parallel with the light entrance surface, for examples, the apex angle of the prisms is set to gradually increase as the prisms is situated farther away from the LED light sources 2. The light-exiting surface may be provided with prisms having a scalene triangular sectional configuration. In this case, the depth of the prism configuration is set to gradually increase or the prism pitch is set to gradually decrease as the prism apex angle is set gradually increases.

The LED light sources 2 may be white LEDs. The white LEDs are, for example, semiconductor light-emitting elements fabricated on respective substrates and sealed with a resin material. Examples of semiconductor light-emitting elements are blue (wavelength $\lambda$: 470 to 490 nm) LED elements or ultraviolet (wavelength $\lambda$: less than 470 nm) LED elements, which may be formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element may be formed, for example, by adding a YAG fluorescent substance into a silicone resin as a main component. The YAG fluorescent substance converts some blue or ultraviolet light from the semiconductor light-emitting element into yellow light, and white light is produced by color mixing effect. It should be noted that the LED light source 2 has a reflecting frame formed on the side surfaces of the resin material except the front end surface to emit light only from the front end surface serving as a light-exiting surface. Further, it is possible to use various white LEDs besides those described above, for example, various combinations of light-emitting elements that emit different colors of light and various combinations of fluorescent substances and light-emitting elements.

The diffusing plate 13A and the diffusing sheet 13B are a plate and a sheet, respectively, made of a transparent resin, e.g. an acrylic or polycarbonate resin, having silica particles dispersed in it, for example. The prism sheet 14 is a transparent sheet-shaped member for collecting light from the diffusing sheet 13B to the upper side and has a plurality of parallel prisms on its upper surface. The prism sheet 14 is set with its prisms intersecting the optical axes of light from the LED light sources 2 in plan view. To obtain high directivity of exiting light in the upward direction, in particular, the prism sheet 14 is set with its prisms perpendicularly intersecting the optical axes of light from the LED light sources 2 in plan view.

The reflecting sheet 15 is a metal plate, film, foil or the like having a light-reflecting function. In this embodiment, the reflecting sheet 15 is a film provided with an evaporated silver layer. It should be noted, however, that an evaporated aluminum layer or the like may be used in place of the evaporated silver layer. The reflecting sheet 15 is bonded to the surface of the bezel by using double-coated adhesive tape (not shown).

The liquid crystal display panel 11 is a transmissive or semitransmissive liquid crystal display panel. In the case of a transmissive liquid crystal display panel 11, for example, it has a TFT, STN, TN or other liquid crystal panel body having a liquid crystal material sealed with a sealant in a gap between an upper substrate and a lower substrate, each having a transparent electrode layer, an alignment film and a polarizer.

Figure 9:
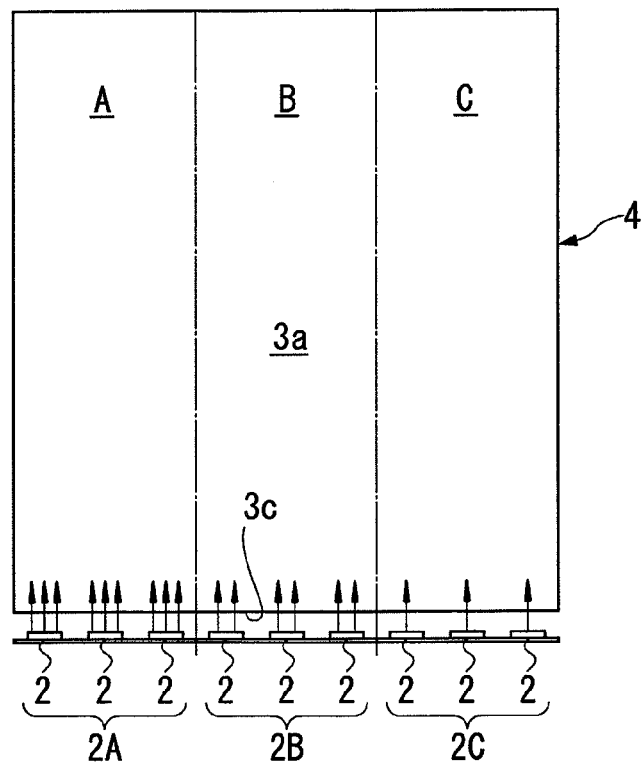
FIG. 9 is a plan view of a planar light-emitting device according to a second embodiment of the present invention.

FIG. 9 shows another embodiment of the planar light-emitting device according to the present invention, which differs from the foregoing embodiment in the structure of the light-emitting units 4. In this embodiment, the rectangular lightguide plate 3 of each light-emitting unit 4 has a front-side surface 3c as a light-entrance surface defined by a surface along one of its short sides. A plurality of light sources 2 are disposed successively and aligned along the width direction of the light-entrance surface 3c and divided into groups each having three light sources 2 to perform output control for each light source group.

Figure 10:
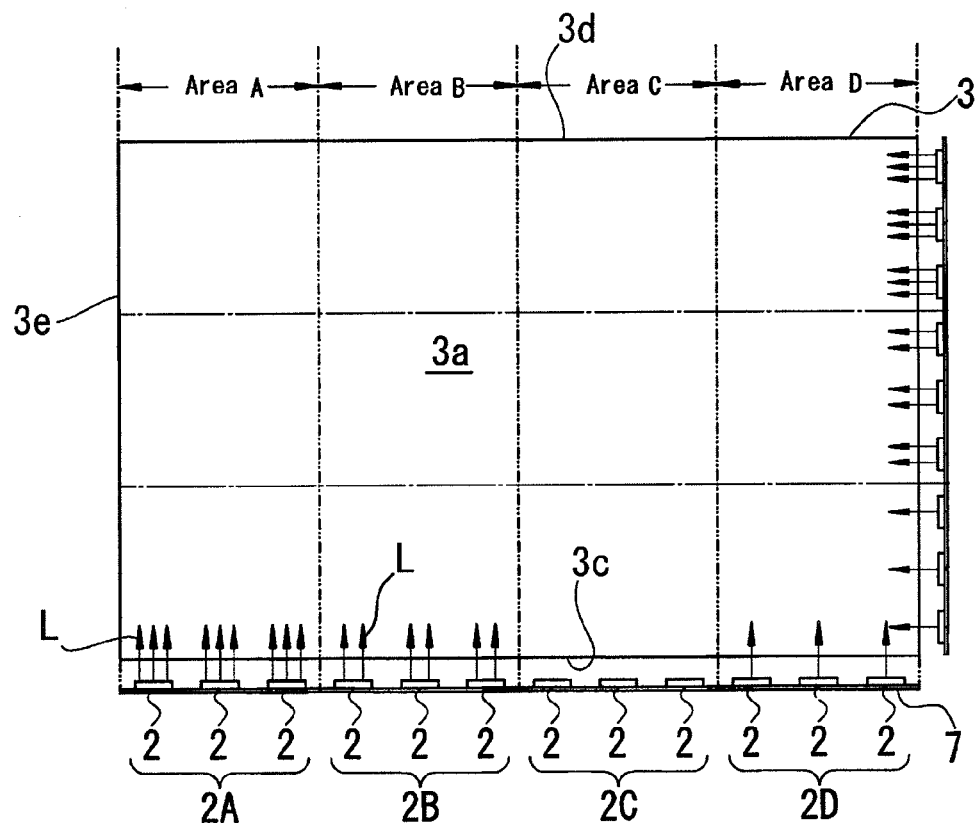
FIG. 10 is a plan view of a planar light-emitting device according to a third embodiment of the present invention.

FIG. 10 shows still another embodiment of the planar light-emitting device according to the present invention, which differs from the foregoing embodiments in the structure of the light-emitting units 4. In this embodiment, a front-side surface 3c of a rectangular lightguide plate 3, which is a surface along one long side of the lightguide plate 3, is defined as a first light-entrance surface, and a plurality of first light sources 2 are successively disposed in the lateral direction, i.e. the width direction of the light-entrance surface 3c, and divided into groups each having three light sources 2 to perform output control for each light source group, as in the case of the first embodiment. In addition, a surface of the lightguide plate 3 along one of short sides, i.e. right and left side surfaces of the lightguide plate 3, is defined as a second light-entrance surface. A plurality of second light sources 2 are successively disposed in the longitudinal direction, i.e. the width direction of the second light-entrance surface, and divided into groups each having three light sources 2 to perform output control for each light source group. A light source output control unit that controls the first light sources may be used to perform output control for each group of second light sources. If more precise output control is needed, a second light source output control unit may be provided to perform output control for each group of second light sources.

The embodiments shown in FIGS. 9 and 10 are the same as the first embodiment except the arrangement of light sources.

Although some embodiments of the present invention have been described above, the present invention is not necessarily limited to the foregoing embodiments but can be modified in a variety of ways without departing from the scope of the present invention.

For example, in the foregoing embodiments, one lightguide plate is divided into four areas, and the light quantity of the groups of LEDs respectively corresponding to the four areas is controlled for each LED group, i.e. for each area. In this regard, one lightguide plate may be divided into three or less or five or more areas to perform output control for each area.

RGB-LEDs may be used as the LED light sources to emit light of all colors. For example, an RGB-LED may comprise a combination of a red LED element (R), a green LED element (G) and a blue LED element (B) mounted in one package. Alternatively, LED light sources emitting mutually different colors of light may be provided for each area of the lightguide plate. In these cases, not only the luminance but also the emission color can be controlled for each light area and for each display area through the control of the applied electric current to each LED.

Although LED light sources are used as light sources in the foregoing embodiments, the number of the light sources in each group may increase, or fluorescent lamps or other types of light sources may also be used.

Although one diffusing plate and one diffusing sheet are used in the backlight unit in the foregoing embodiments, either of the diffusing plate and the diffusing sheet may be omitted, or a plurality of at least one of them may be used. The backlight unit may have a diffusing plate or sheet between the prism sheet and the liquid crystal display panel. In other words, the installation position and the number of diffusing plates or sheets are properly set by taking into account the number of plates or sheets, or haze to correct luminance unevenness.

Although one prism sheet is used in the foregoing embodiments, the backlight unit may use two prism sheets. Although the foregoing embodiments employ a diffusing plate, a diffusing sheet and a prism sheet, each having a size corresponding to that of the liquid crystal display panel, these members may each comprise a plurality of split segments that are arranged side by side in the same way as the lightguide plates.

It should be noted that the present invention is not necessarily limited to the foregoing embodiment but can be modified in a variety of ways without departing from the gist of the present invention.

The invention claimed is:

1. A planar light-emitting device comprising:
a plurality of adjacently disposed light-emitting units, each light-emitting unit including:
a plurality of light sources, and
a lightguide plate being solid and having an upper surface as a light-exiting surface divided into light-exiting areas, a lower surface opposite to the upper surface, and a peripheral side surface extending between respective peripheral edges of the upper and lower surfaces,
the peripheral side surface having a front-side surface as a light-entrance surface, a rear-side surface opposite to the front-side surface, and right and left side surfaces extending between respective ends of the front-side and rear-side surfaces,
the light sources being divided into a plurality of groups and successively aligned along a width direction of the light-entrance surface of the lightguide plate and facing the light-entrance surface of the lightguide plate such that each group of light sources is arranged to output light to a respective light-exiting area, and
the lightguide plates of the light-emitting units being mutually adjacently disposed with their light-exiting surfaces flush with each other to form an integrated light-exiting surface; and
a light source output control unit that controls output of the light sources of the light source groups for the respective light-exiting areas of the light-exiting surface of the lightguide plate in each light-emitting unit.

2. The planar light-emitting device of claim 1, wherein the light source output control unit changes outputs of the light sources successively stepwise for each of the light source groups aligned along the width direction of the light-entrance surface of each of the lightguide plates.

3. The planar light-emitting device of claim 1, wherein the light source output control unit sets a difference in luminance between mutually adjacent endmost light source groups of respective light source groups of a pair of the light-emitting units that are adjacent to each other and aligned in the width direction of the light-entrance surface of the lightguide plate, the difference being smaller than a difference in luminance between other mutually adjacent light source groups of the respective light source groups of the pair of the light-emitting units.

4. The planar light-emitting device of claim 1, wherein the light source output control unit sets a mutually same luminance for mutually adjacent endmost light source groups of respective light source groups of a pair of the light-emitting units that are adjacent to each other and aligned in the width direction of the light-entrance surface of the lightguide plate.

5. The planar light-emitting device of claim 1, wherein the light source output control unit sets luminances for mutually adjacent endmost light source groups of respective light source groups of a pair of the light-emitting units that are adjacent to each other and aligned in the width direction of the light-entrance surface of the lightguide plate, the luminances being higher than luminances of other mutually adjacent light sources groups of the respective light source groups of the pair of the light-emitting units.

6. The planar light-emitting device of claim 1, wherein, in at least one of the light-emitting units, the light-entrance surface of the lightguide plate is defined as a first light-entrance surface, the light sources successively disposed in the width direction of the first light-entrance surface being defined as first light sources, the light source output control unit that controls outputs of the first light sources for each of the light source groups being defined as a first light source output control unit, either of the right and left sides surfaces of the lightguide plate being defined as a second light-entrance surface, the planar light-emitting device further having a plurality of light sources as second light sources disposed to face the second light-entrance surface, and the second light sources being divided into a plurality of second light source groups successively arranged in a width direction of the second light-entrance surface, each second light source group including at least one of the second light sources, the planar light-emitting device further comprising:

a second light source output control unit that controls outputs of the second light sources for each of the second light source groups.

7. The planar light-emitting device of claim 6, wherein the second light source output control unit changes outputs of the second light sources of each of the light-emitting units successively stepwise for each of the second light source groups aligned along the width direction of the second light-entrance surface of each of the lightguide plates.

8. The planar light-emitting device of claim 6, wherein the second light source output control unit sets a difference in luminance between mutually adjacent endmost light source groups of respective second light source groups of a pair of the light-emitting units that are adjacent to each other and aligned along the width direction of the second light-entrance surface of the lightguide plate, the difference being smaller than a difference in luminance between other mutually adjacent light source groups of the respective second light source groups of the pair of the light-emitting units.

9. The planar light-emitting device of claim 6, wherein the second light source output control unit sets a mutually same luminance for mutually adjacent endmost light source groups of respective second light source groups of a pair of the light-emitting units that are adjacent to each other and aligned in the width direction of the second light-entrance surface of the lightguide plate.

10. The planar light-emitting device of claim 6, wherein the second light source output control unit sets luminances for mutually adjacent endmost light source groups of respective second light source groups of a pair of the light-emitting units that are adjacent to each other and aligned in the width direction of the second light-entrance surface of the lightguide plate, the luminances being higher than luminances of other mutually adjacent light source groups of the respective second light source groups of the pair of the light-emitting units.

11. The planar light-emitting device of claim 6, wherein each of the light source groups includes a plurality of light-emitting diode elements emitting different colors of light.

12. The planar light-emitting device of claim 6, wherein the lightguide plate is of a rectangular shape having a pair of mutually opposing long sides and a pair of mutually opposing short sides in a plan view, the first light-entrance surface being along one of the long sides and the second light-entrance surface being one of the short sides of the rectangular shape.

13. A liquid crystal display apparatus comprising:

a liquid crystal display panel; and the planar light-emitting device of claim 6, the planar light-emitting device disposed underneath the liquid crystal display panel;

the first and second light source output control units controlling outputs of the respective first and second light sources in accordance with image data on images to be displayed on display areas of the liquid crystal display panel located directly above the respective light-exiting surfaces of the planar light-emitting device.

14. The planar light-emitting device of claim 1, wherein the lightguide plate is of a rectangular shape having a pair of mutually opposing long sides and a pair of mutually opposing short sides in a plan view, the light-entrance surface being a surface along one of the long sides of the rectangular shape.

15. The planar light-emitting device of claim 1, wherein the lightguide plate is of a rectangular shape having a pair of mutually opposing long sides and a pair of mutually opposing short sides in a plan view, the light-entrance surface being a surface along one of the short sides of the rectangular shape.

16. The planar light-emitting device of claim 1, wherein the at least one of the light sources has a red light-emitting diode element, a green light-emitting diode element, and a blue light-emitting diode element.

17. The planar light-emitting device of claim 1, wherein each of the light source groups includes a plurality of light-emitting diode elements emitting different colors of light.

18. The planar light-emitting device of claim 1, wherein the light sources include white light-emitting diodes.

19. A liquid crystal display apparatus comprising:

a liquid crystal display panel; and the planar light-emitting device of claim 1, the planar light-emitting device disposed underneath the liquid crystal display panel;

the light source output control unit controlling outputs of the light sources in accordance with image data on images to be displayed on display areas of the liquid crystal display panel located directly above the respective light-exiting surfaces of the light-emitting units.

20. The planar light-emitting device of claim 1, wherein, in at least one of the light-emitting units, the light-entrance surface of the lightguide plate is defined as a first light-entrance surface, the light sources successively aligned along the width direction of the first light-entrance surface being defined as first light sources, either of the right and left sides surfaces of the lightguide plate being defined as a second light-entrance surface, the planar light-emitting device further having a plurality of light sources as second light sources that are aligned along the width direction of the second light-entrance surface, the second light sources being divided into a plurality of second light source groups successively aligned along a width direction of the second light-entrance surface, each second light source group including at least one of the second light sources, and the light source output control unit controlling outputs of the second light sources for each of the second light source groups.

* * * * *

UNITED STATES PATENT AND TRADEMARK OFFICE
CERTIFICATE OF CORRECTION

PATENT NO. : 8,368,838 B2
APPLICATION NO. : 12/499387
DATED : February 5, 2013
INVENTOR(S) : Taku Kumasaka It is certified that error appears in the above-identified patent and that said Letters Patent is hereby corrected as shown below:

In the Claims

In column 10, line 66, "sources groups of the respective light source groups of the" should read -- source groups of the respective light source groups of the --.

Signed and Sealed this
Fourth Day of June, 2013

Teresa Stanek Rea
*Acting Director of the United States Patent and Trademark Office*